(12) United States Patent
Crouch

(10) Patent No.: US 8,072,380 B2
(45) Date of Patent: Dec. 6, 2011

(54) WIRELESS POWER TRANSMISSION SYSTEM AND METHOD

(75) Inventor: David Crouch, Corona, CA (US)

(73) Assignee: Raytheon Company, Waltham, MA (US)

(*) Notice: Subject to any disclaimer, the term of this patent is extended or adjusted under 35 U.S.C. 154(b) by 246 days.

(21) Appl. No.: 12/421,789

(22) Filed: Apr. 10, 2009

(65) Prior Publication Data

US 2010/0259447 A1 Oct. 14, 2010

(51) Int. Cl.
*H01Q 1/00* (2006.01)
(52) U.S. Cl. .................................................. 342/370
(58) Field of Classification Search .................. 342/370
See application file for complete search history.

(56) References Cited

U.S. PATENT DOCUMENTS

| | | | |
|---|---|---|---|
| 3,925,784 A * | 12/1975 | Phelan | 343/754 |
| 5,068,669 A | 11/1991 | Koert et al. | |
| 5,503,350 A | 4/1996 | Foote | |
| 6,114,834 A | 9/2000 | Parise | |
| 6,657,580 B1 * | 12/2003 | Edwards et al. | 342/51 |
| 7,304,607 B2 * | 12/2007 | Miyamoto et al. | 342/370 |
| 7,711,441 B2 * | 5/2010 | Tillotson | 700/59 |
| 2004/0142733 A1 * | 7/2004 | Parise | 455/572 |
| 2005/0030226 A1 * | 2/2005 | Miyamoto et al. | 342/370 |
| 2006/0266564 A1 | 11/2006 | Perlman | |

OTHER PUBLICATIONS

Jorgensen et al., "Retrodirective Antenna Systems for Wireless Communications", CNSR 2003, Moncton, New Brunswick, Canada.*

Epp et al., "A Compact Dual-Polarized 8.51-GHz Rectenna for High-Voltage (50V) Actuator Applications", IEEE Transactions on Microwave Theory and Techniques, vol. 49, No. 1, Jan. 2000.*

Luxey et al., "A Retrodirective Transponder with Polarization Duplexing for Dedicated Short-Range Communications", IEEE Transactions on Microwave Theory and Techniques, vol. 47, No. 9, Sep. 1999.*

Ren et al., "New 5.8-GHz Circularly Polarized Retrodirective Rectenna Arrays for Wireless Power Transmission", IEEE Transactions on Microwave Theory and Techniques, vol. 54, No. 7, Jul. 2006.*

William C. Brown, "The History of Power Transmission by Radio Waves," IEEE Transactions on Microwave Theory and Techniques, vol. MTT-32, No. 9, pp. 1230-1242, Sep. 1984.

C.T. Rodenbeck; Ming-yi Li; Kai Chang, "A phased-array architecture for retrodirective microwave power transmission from the space solar power satellite," Microwave Symposium Digest, 2004 IEEE MTT-S International, vol. 3, No., pp. 1679-1682 vol. 3, 6-11, Jun. 20.

R.C. Chernoff, "Large Active Retrodirective Arrays for Space Applications," IEEE Trans. Antennas and Propagation, vol. AP-27, No. 4, pp. 489-496, Jul. 1979.

(Continued)

*Primary Examiner* — Thomas Tarcza
*Assistant Examiner* — Frank McGue
(74) *Attorney, Agent, or Firm* — Renner, Otto, Boisselle & Sklar, LLP

(57) ABSTRACT

A wireless power transmission system including at least one source of electromagnetic radiation, a plurality of wireless power receivers that receive radiated electromagnetic energy, a beacon collocated with each wireless power receiver, wherein the beacon generates and radiates a pilot signal when the beacon is in an active state, and an array of transmitting antennas connected to the source of electromagnetic radiation that radiates the electromagnetic radiation in the direction of the beacon in the active state. The electromagnetic radiation can be electronically steered from one wireless power receiver to another by activating and deactivating the beacons collocated with each wireless power receiver.

31 Claims, 9 Drawing Sheets

OTHER PUBLICATIONS

G.D. Arndt and E.M. Kerwin, "Multiple Beam Microwave Systems for the Solar Power Satellite," Space Solar Power Review, vol. 3, pp. 301-315, 1982.

International Search Report and Written Opinion from corresponding International Application No. PCT/US10/30153, Mar. 4, 2011.

Zhu Xi et al., "Wireless Charging System Based on Switched Beam Smart Antenna Technique", Microwave, Antenna, Propagation and EMC Technologies for Wireless Communications, 2007 International Symposium, IEEE, pp. 486-489.

* cited by examiner

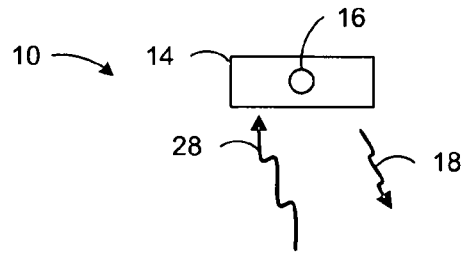
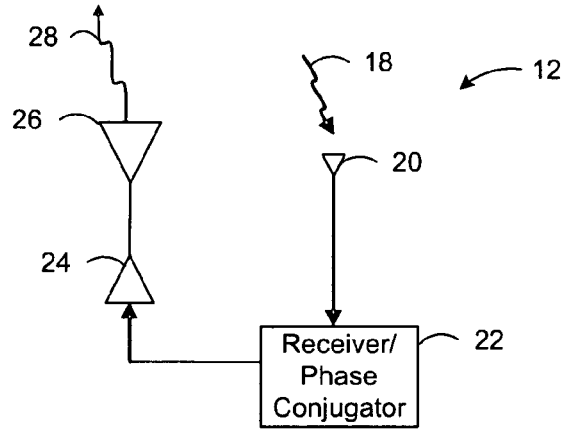
FIG. 1
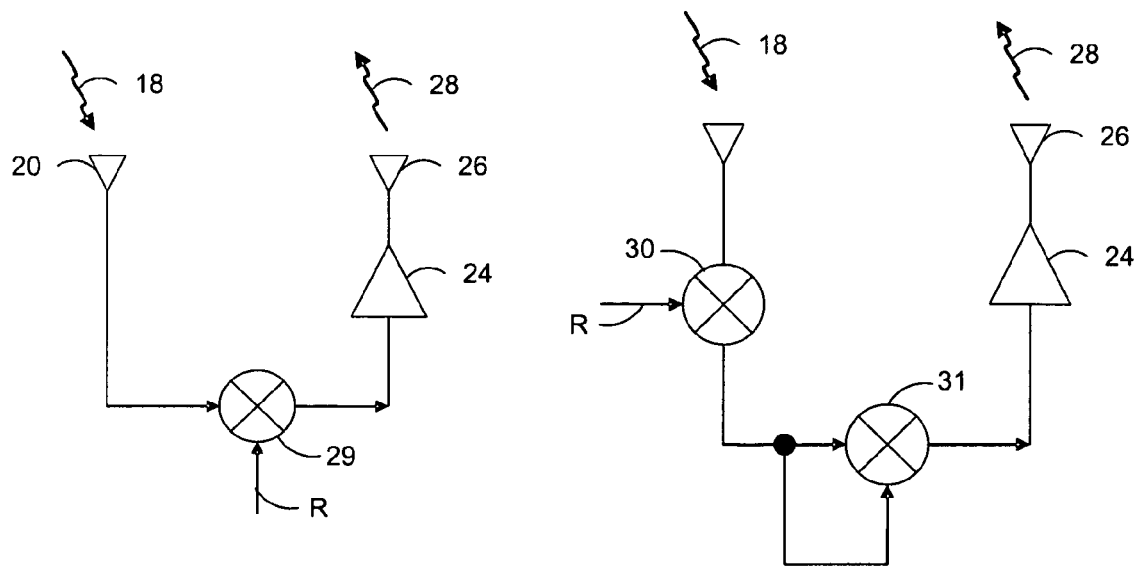
FIG. 2
FIG. 3

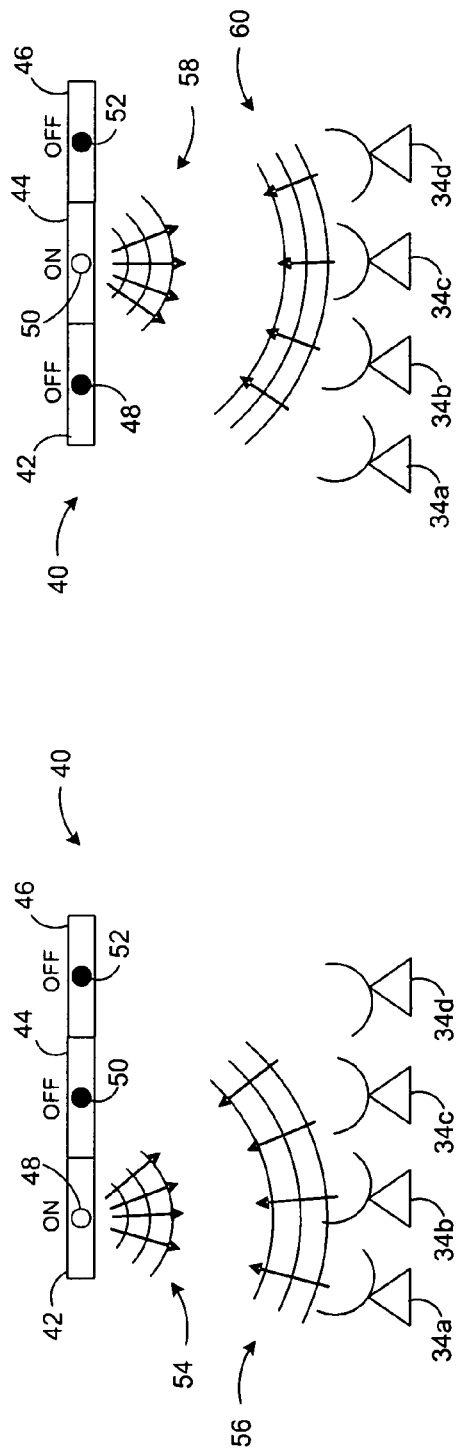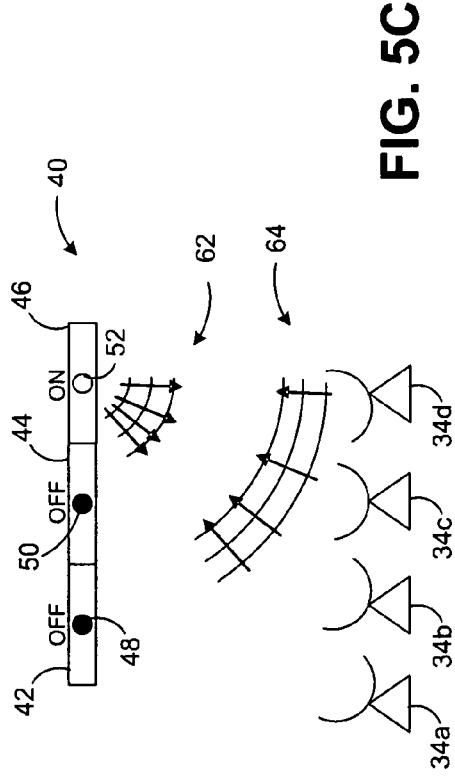

WIRELESS POWER TRANSMISSION SYSTEM AND METHOD

FIELD OF THE INVENTION

The present invention generally relates to the generation, transmission, and reception of wirelessly-transmitted power, and more specifically, to wireless power transmission systems capable of efficiently illuminating multiple dispersed wireless power receivers.

DESCRIPTION OF THE RELATED ART

Wireless power transmission is of increasing interest for both military and commercial applications. Potential applications include power transmission from space to earth and microwave-powered aircraft, whose applications include communications, reconnaissance, surveillance, and remote sensing (for a general discussion, see "The History of Power Transmission by Radio Waves" by William C. Brown, IEEE Transactions on Microwave Theory and Techniques, Vol. MTT-32, No. 9, pp. 1230-1242, September 1984).

Some applications require the use of multiple dispersed wireless power receivers (WPRs). A broad-beam illumination of all receivers simultaneously can be implemented with a wide-beam antenna fed by a high-power radio frequency (RF) source. Broad-beam illumination, however, is a highly inefficient method of illumination because most of the radiated power falls between the receivers and is wasted. Narrow-beam illumination can be used to efficiently illuminate a single receiver, but very little power is delivered to receivers outside the beam width of the transmitting antenna.

In the context of solar power satellites, Arndt and Kerwin (see "Multiple Beam Microwave Systems for the Solar Power Satellite" by G. D. Arndt and E. M. Kerwin, Space Solar Power Review, Vol. 3, pp. 301-315, 1982) have proposed a multiple-beam system by which an orbiting solar power satellite beams power to multiple receiving sites on the earth at the same time. This type of system requires a large phased array antenna having an illumination function that is the complex sum of the individual illumination functions required to generate each separate beam. As a result, many array elements may be required to operate at less than full output power. Because the efficiency of many microwave power devices (both solid state and vacuum electron devices) falls off dramatically when operated at less than full power, this approach may not provide enough power to allow the system to operate with a high efficiency.

Improvements over such wireless power transmission systems would generally be desirable.

SUMMARY OF THE INVENTION

To overcome at least the drawbacks of other wireless power transmission systems, a system for wireless delivery of electromagnetic energy to multiple dispersed wireless power receivers (also referred to as "WPRs") is provided. According to the system described below, multiple dispersed receivers can be illuminated with minimum energy falling in the space between receivers.

The system sequentially illuminates a set of dispersed wireless power receivers with a single narrow beam of radio-frequency (RF) radiation at one frequency (also referred to as an "illumination frequency") from an array of transmitting antennas, which may, for example, be a retrodirective antenna array (also referred to as an "RDA"). Each WPR is collocated with an RF beacon. When activated, the beacon transmits a pilot signal at another frequency (also referred to as a "pilot signal frequency"), which may be the same or different from the illumination frequency.

Each element in the RDA includes a receiver that receives the pilot signal. Each receiver includes phase conjugating circuitry that extracts the phase from the pilot signal at the pilot signal frequency and forms a conjugated signal at the illumination frequency. The conjugated signal is then amplified by an amplifier and directed to an array of transmitting antennas. Each element of the RDA radiates an amplified beam whose polarization is substantially the same as that radiated by all other elements relative to a Cartesian coordinate system common to all elements of the RDA. By conjugating the phase extracted from the pilot signal, each element of the RDA radiates an amplified beam that is in phase with those beams radiated by all other elements of the RDA at the location of the activated beacon.

The amplified signals from each element in the RDA converge at the activated beacon. Because the amplified signals are of substantially the same polarization and carry the conjugate of the phase extracted from the pilot signal, the amplified signals combine in phase or collectively accumulate to yield an electromagnetic field whose amplitude is about, or nearly, N times greater than the electromagnetic field generated by a single element, where N is the number of elements in the RDA. The power density, therefore, is about $N^2$ times greater than the power density due to a single element of the RDA.

If the system includes multiple WPRs, each is equipped with a beacon that transmits a pilot signal at a pilot signal frequency when activated. By activating and deactivating the different beacons, the beam of electromagnetic energy at the illumination frequency from the RDA is steered electronically from one WPR to another. Furthermore, no mechanical steering is required as long as all WPRs reside within the beam width of each array element, which may be a 3 dB beam width, for example. Any number of WPRs can be illuminated in any order, and the time for which the beam dwells on each WPR can be chosen by an operator, calculated based upon the power needs and power received by each WPR, or based upon a schedule.

It will be appreciated that the elements in the RDA also may be moved mechanically or steered to point at the target, for example, if the target is moving over a large area or if the WPRs are widely dispersed. The target object(s), therefore, may include a tracking beacon that radiates a tracking signal indicative of the current location of the object or the active beacon. The elements in the RDA accordingly can be moved such that they are always aimed at the target object.

The elements in the RDA may be phased array antennas whose beams can be electronically steered to point at the target, for example, if the target is moving over a large area or if the WPRs are widely dispersed. The tracking beacon radiates a tracking signal indicative of the current location of the object or the location of the active beacon. With target location information derived from the tracking signal, the beams radiated by the phased-array elements in the RDA can accordingly be steered electronically such that they are always aimed at the target object. Furthermore, electronic and mechanical steering can be combined so that if the target object lies outside the field of view of one or more elements of the RDA, those elements can be mechanically steered to point at the target object.

According to an aspect of the invention, a switched-beam wireless power transmission system includes at least one electromagnetic radiation source, a plurality of wireless power receivers each collocated with a beacon that radiates a pilot signal when the beacon is in an active state, and an array of transmitting antennas that receives the pilot signal from the active beacon and radiates the electromagnetic radiation from the at least one electromagnetic radiation source in the direction of the wireless power receiver collocated with the beacon in the active state. The direction of the radiated electromagnetic radiation is switched among the wireless power receivers based upon which beacon is in an active state.

According to another aspect, a method of wirelessly transmitting power from a retrodirective array to an array of wireless power receivers includes: (i) activating a beacon on a wireless power receiver by radiating a pilot signal with the beacon; (ii) receiving the pilot signal, extracting the phase from the pilot signal, and forming a conjugated signal with a receiving unit on each element in the retrodirective array; (iii) amplifying each conjugated signal with an amplifier; (iv) radiating each amplified signal in the direction of the activated beacon with a transmitting antenna on each element in the retrodirective array; (v) receiving the amplified signal with the wireless power receiver that is collocated with the activated beacon; (vi) deactivating the activated beacon by extinguishing the pilot signal and repeating steps (i)-(v) for a beacon on a different wireless power receiver.

According to another aspect, a switched-beam wireless power transmission system includes one or more amplifying sources of electromagnetic radiation, an array of transmitting antennas corresponding to each amplifying source, a transmission line that transports the electromagnetic radiation from each source to each corresponding transmitting antenna, a plurality of wireless power receivers that receive the electromagnetic energy radiated by the transmitting antennas and convert the electromagnetic energy to DC power, and a control system that controls the transmitting antennas to direct electromagnetic radiation at different wireless power receivers for varying lengths of time according to a schedule.

According to another aspect, a wireless power transmission system includes at least one electromagnetic radiation source, at least one wireless power receiver collocated with a beacon that radiates a high frequency carrier signal, wherein a pilot signal is impressed or carried on the high frequency carrier signal, and at least one transmitting antenna that includes a receiving unit that receives the high frequency carrier signal and includes circuitry to extract the pilot signal from the carrier signal. The at least one transmitting antenna radiates electromagnetic radiation from the at least one electromagnetic source in the direction of the pilot signal to transmit power to the wireless power receiver.

The foregoing and other features of the invention are hereinafter fully described and particularly pointed out in the claims, the following description and the annexed drawings setting forth in detail several illustrative embodiments of the invention, such being indicative, however, of but a few of the various ways in which the principles of the invention may be employed.

BRIEF DESCRIPTION OF THE DRAWINGS

In the annexed drawings, which are not necessarily to scale:

FIG. 1 is a generalized schematic view of a single element of a retrodirective array.

FIG. 2 is a schematic view of a representative phase-conjugating circuit for use when the pilot signal and the phase-conjugated signal are of the same frequency.

FIG. 3 is a schematic view of a representative phase-conjugating circuit for use when the frequency of the phase-conjugated signal is twice that of the pilot signal.

FIGS. 5A-5C illustrate a schematic embodiment of a four element switched-beam wireless power transmission system and a microwave-power aircraft having three beacons.

DETAILED DESCRIPTION

Figure 4:
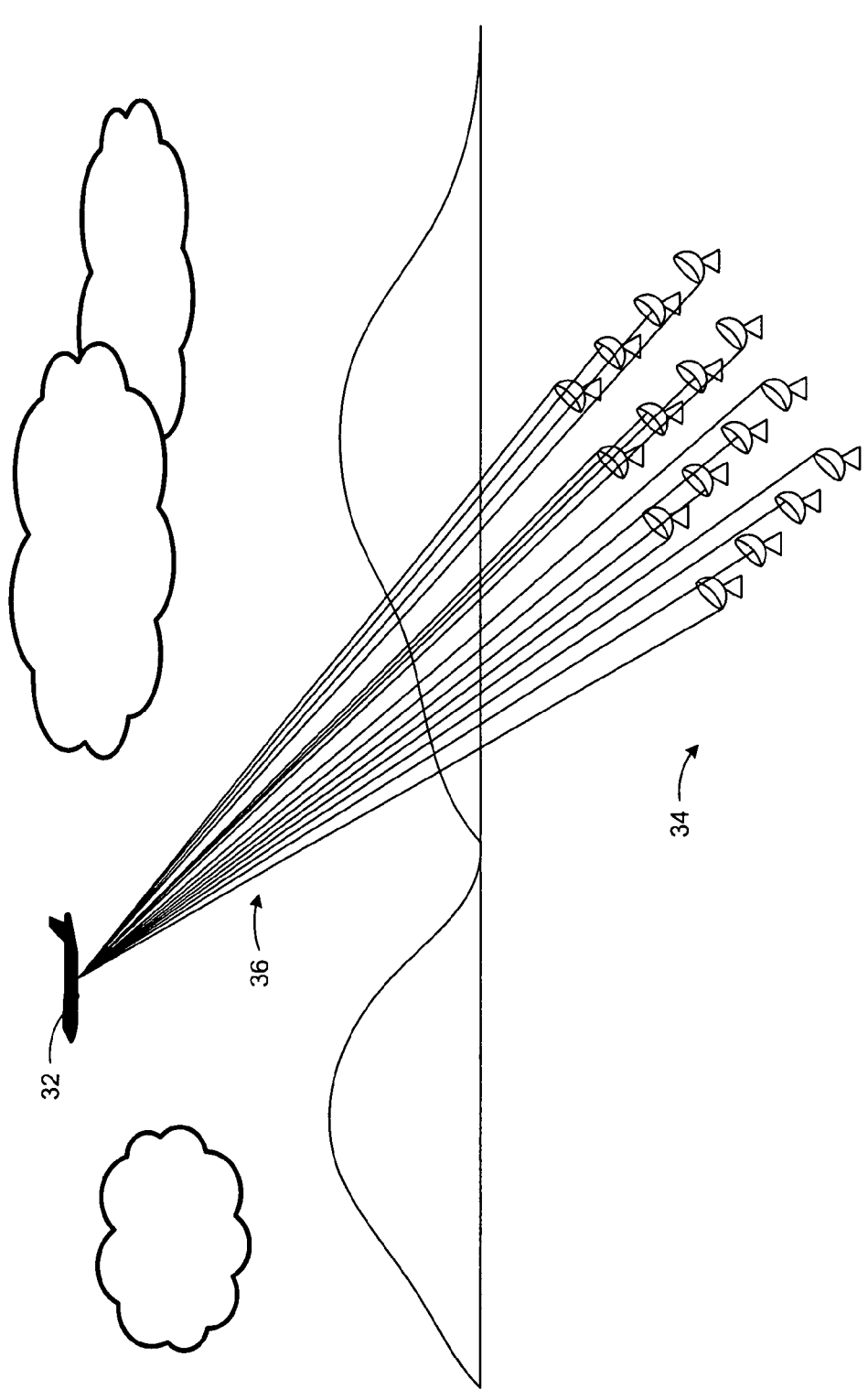
FIG. 4 is a perspective view of a sixteen element switched-beam wireless power transmitter that is part of a microwave-powered aircraft system.

Referring initially to FIG. 1, a simplified block drawing is used to illustrate the basic operation of a switched beam wireless power transmission system 10. The system 10 includes at least one source of electromagnetic energy, such as an array of transmitting antennas 12, such as a retrodirective array of antennas (collectively referred to as an "RDA"), which may be, for example, parabolic reflecting antennas, phased array antennas, etc. The power generated by the at least one source of electromagnetic radiation can be divided among a plurality of antenna elements. For simplicity, the operation of a single transmitting antenna 12 is described.

Each element 12 in the RDA is used to illuminate or to transmit energy to one or more dispersed WPRs 14, which may be, for example, one or more rectennas or rectifying antennas.

Each WPR 14 is collocated with a beacon 16. The beacon 16 radiates a pilot signal 18 at a first frequency when the beacon 16 is in an active state. The pilot signal 18 is received by each element 12 in the RDA to direct electromagnetic radiation at a second frequency to the WPR 14 that is collocated with the beacon 16 in the active state. By extinguishing the beacon associated with one WPR and activating a beacon associated with a different WPR, the beam of electromagnetic radiation radiated by the RDA is electronically steered from one WPR to another. In this manner, each WPR can be illuminated as needed to meet the average power requirements of the WPR.

Each element 12 in the RDA receives the pilot signal 18 from the beacon 16 that is collocated with the WPR 14 that is to be illuminated with electromagnetic radiation. Each element 12 in the RDA includes a receive antenna 20 for receiving the pilot signal 18 and a receiver/phase conjugator 22. The pilot signal 18 at a first frequency is received by the receive antenna 20 and transmitted to the receiver/phase conjugator 22. The receiver/phase conjugator 22 extracts the phase from the pilot signal 18 and forms a phase-conjugated signal at a second frequency that it transmits to an amplifier 24. The amplifier 24 amplifies the phase conjugated signal and transmits the amplified signal to a transmit antenna 26. The amplified signal 28 is radiated from the transmit antenna 26. The polarization of the amplified signal 28 radiated by each element 12 of the RDA is substantially the same, and may be measured relative to a Cartesian coordinate system common to all elements of the RDA, for example. The amplified signal 28 may be linearly polarized or circularly polarized. If the amplified signal 28 is linearly polarized, then the rectenna is a dual-linearly polarized rectenna. If the amplified signal 28 has a circular polarization, then the rectenna is a circularly-polarized rectenna whose polarization matches that of the amplified signal 28.

Because the phase of the amplified signal 28 is the conjugate of the phase extracted from the pilot signal 18 and because the polarization of each amplified signal 28 is substantially the same, the amplified signal, which is the collective sum of all the amplified signals 28 radiated by the individual elements of the RDA, converges or collectively accumulates such that the electric-field vectors are aligned and add in phase at the site of the active beacon 16.

As illustrated in FIG. 1, the receive antenna 20 and transmit antenna 26 of each element 12 in the RDA may be separate from one another to maintain a high isolation between the path of the transmit signal 28 and the path of the pilot signal 18. It will be appreciated, however, that the receive antenna 20 and the transmit antenna 26 may be combined as a transceiver as may be desired.

The beacon 16 broadcasts the pilot signal 18 of the form:

$$V_B(t) = A \cos(\omega t + \theta_0) \quad (Eq. 1)$$

where $\omega = 2\pi f$, f is the frequency, A is the signal amplitude, and $\theta_0$ is an arbitrary phase. The signal received by the $k^{th}$ element of the RDA at time t is proportional to that radiated by the beacon 16 at an earlier time $t - r_k/c$, where $r_k$ is the distance from the beacon 16 to the $k^{th}$ receive antenna 20 and c is the velocity of light ($c = 2.9979 \times 10^8$ meters/second in vacuum):

$$V_R^k(t) = B \cos[\omega(t - r_k/c) + \theta_0] = B \cos(\omega t + \phi_t), \quad (Eq. 2)$$

where $\phi_t = -\omega r_k/c + \theta_0$ is the accumulated phase of the received signal and B is the signal amplitude. The received pilot signal 18 is processed by phase conjugating circuitry in the receiver/phase conjugator 22. The phase conjugating circuitry extracts the phase from the pilot signal 18 and forms a phase-conjugated signal at a second frequency and transmits the signal to the amplifier 24, such as a high-power microwave amplifier.

If the first frequency of the pilot signal 18 and the second frequency of the phase-conjugated signal are the same, then the phase conjugating circuitry may assume a form like that illustrated in FIG. 2. In FIG. 2, the pilot signal 18 is received by the receive antenna 20, which transmits the received signal 18 to a mixer 29. The mixer 29 multiplies the received signal with a reference signal R whose frequency is $2\omega = 4\pi f$ and whose phase is $\phi_{REF}$ to generate a signal containing the desired phase-conjugated signal;

$$\cos(\omega t + \phi_t) \times \cos(2\omega t + \phi_{REF}) = \frac{1}{2}\begin{bmatrix} \cos(3\omega t + \phi_t + \phi_{REF}) + \\ \cos(\omega t + \phi_{REF} - \phi_t) \end{bmatrix}, \quad (Eq. 3)$$

where $\phi_{REF}$ has the same value for all elements of the RDA. The phase conjugated signal is extracted by processing this signal with a low-pass filter (not shown in FIG. 2). The phase conjugated signal is amplified with the amplifier 24 and transmitted by the transmitting antenna 26 of each element in the array. The phase-conjugated signal extracted from Eq. 3 and amplified by the $k^{th}$ element of the RDA is of the form:

$$V_T^k(t) = C \cos(\omega t + \phi_{REF} - \phi_t) = C \cos[\omega(t + r_k/c) + \phi_{REF} - \theta_0], \quad (Eq. 4)$$

where C is the amplitude of the transmitted signal.

The amplified or high-power signal 28 incident on the WPR 14 at time t from the $k^{th}$ element of the RDA is that transmitted at an earlier time $t - r_k/c$, so that $$\begin{aligned} V_{HP}^k(t) &= D\cos[\omega(t - r_k/c) + \phi_{REF} - \phi_t] \\ &= D\cos[\omega(t - r_k/c) + \omega r_k/c + \phi_{REF} - \theta_0] \\ &= D\cos(\omega t + \phi_{REF} - \theta_0). \end{aligned} \quad (Eq. 5)$$

where D is the amplitude of the signal incident on the WPR 14.

Because the phase of the incident signal $V_{HP}^k(t)$ is independent of the array index k, the signals from each array element arrive at the WPR 14 with the same phase. If the polarization of the amplified signal transmitted by each transmitting antenna 26 is substantially the same, then the electromagnetic fields radiated by each array element will add vectorially to yield a power density that exceeds that from a single element by about a factor of $N^2$, where N is the number of array elements;

$$V_{HP}^{total}(t) = \sum_{k=1}^{N} V_{HP}^k(t) = ND\cos(\omega t + \phi_{REF} - \theta_0) \quad (Eq. 6)$$

$$\overline{P_{HP}^{total}} \propto \overline{[V_{HP}^{total}(t)]^2} = N^2 D^2 \overline{\cos^2(\omega t + \phi_{REF} - \theta_0)} \quad (Eq. 7)$$
$$= \frac{1}{2} N^2 D^2$$

where $V_{HP}^{total}(t)$ in Eq. 6 is the amplitude of the total field incident on the WPR, and $\overline{P_{HP}^{total}}$ in Eq. 7 is the corresponding time-averaged power density.

If the pilot signal 18 and the amplified phase-conjugated signal 28 are of the same frequency, feedback from the transmit antenna 26 to the receive antenna 20 may result. Feedback may interfere with the proper operation of the system 10. Two means by which feedback may be prevented will be described. The first means utilizes at least one very high-frequency beam of electromagnetic radiation such as a laser beam as a carrier for the pilot beam signal. If amplitude modulation is utilized to carry the pilot beam signal, the amplitude of such a signal may be of the form $$e(t) = [a + b\cos(\omega_{RF} t + \theta_0)] \cos \omega_0 t, \quad (Eq. 8)$$

where a and b are constants, $\omega_{RF} = 2\pi f_{RF}$ is the RF frequency, $\omega_0 = 2\pi f_0$ is the carrier frequency, and $\theta_0$ is an arbitrary phase. The transmitted signal described in Eq. 8 may be expressed as a sum of monochromatic signals;

$$e_{trans}(t) = a\cos\omega_0 t + \frac{b}{2}\left\{\begin{array}{l} \cos[(\omega_0 + \omega_{RF})t + \theta_0] + \\ \cos[(\omega_0 - \omega_{RF})t - \theta_0] \end{array}\right\}. \quad (Eq. 9)$$

The signal incident on the $k^{th}$ element of the RDA at time t is proportional to that radiated by the beacon 16 at an earlier time $t - r_k/c$, where $r_k$ is the distance from the beacon 16 to the $k^{th}$ receive antenna 20 and c is the velocity of light ($c = 2.9979 \times 10^8$ meters/second in vacuum):

$$e_{rec}^k(t) = a\cos\left[\omega_0\left(t - \frac{r_k}{c}\right)\right] + \frac{b}{2}\left\{\cos\left[\frac{(\omega_0 + \omega_{RF})}{\left(t - \frac{r_k}{c}\right)} + \theta_0\right] + \cos\left[\frac{(\omega_0 - \omega_{RF})}{\left(t - \frac{r_k}{c}\right)} - \theta_0\right]\right\}. \quad \text{(Eq. 10)}$$

At each element of the RDA, the modulated carrier beam is received by a detector. It is well known to those skilled in the art that the output of a square-law detector is proportional to the average value of $e_{rec}^2(t)$, where the averaging is performed over a few periods of the high-frequency carrier, eliminating components of the signal at frequencies $\omega_0$, $2\omega_0$, $\omega_0 \pm \omega_{RF}$, etc., but preserving the RF components at frequencies $\omega_{RF}$ and $2\omega_{RF}$. The detector output signal produced by this averaging process is $$v^k(t) \propto \overline{[e_{rec}^k(t)]^2} = a^2 + \frac{b^2}{2} + 2ab\cos\left[\omega_{RF}\left(t - \frac{r_k}{c}\right) + \theta_0\right] + \frac{b^2}{2}\cos\left[2\omega_{RF}\left(t - \frac{r_k}{c}\right) + 2\theta_0\right]. \quad \text{(Eq. 11)}$$

This signal contains frequency components at dc, at $\omega_{RF}$, and at $2\omega_{RF}$. If only the component at $\omega_{RF}$ is desired, the undesired components at dc and $2\omega_{RF}$ may be eliminated via filtering. For example, by first passing the signal through a high-pass filter having a cutoff frequency well below $\omega_{RF}$ and then through a low-pass filter having a cutoff frequency between $\omega_{RF}$ and $2\omega_{RF}$, both the dc component and the RF component at $2\omega_{RF}$ may be eliminated. The filtered signal assumes the form $$v_{filt}^k(t) = C\cos\left[\omega_{RF}\left(t - \frac{r_k}{C}\right) + \theta_0 + \phi_{filt}^k\right], \quad \text{(Eq. 12)}$$

where $\phi_{filt}^k$ is the phase imposed upon the detected signal by the filter chain of the $k^{th}$ receive element. By matching the filters comprising the filter chains associated with each element of the RDA, all values of $\phi_{filt}^k$ can be made to fall within a narrow range, in which case $\phi_{filt}^k$ can be treated as a constant independent of k;

$$v_{filt}^k(t) = C\cos\left[\omega_{RF}\left(t - \frac{r_k}{c}\right) + \theta_0 + \phi_{filt}\right] \quad \text{(Eq. 13)}$$
$$= C\cos\left[\omega_{RF}\left(t - \frac{r_k}{c}\right) + \theta_0'\right]$$
$$= C\cos(\omega_{RF}t + \phi_t'),$$

where $\theta'_0 = \theta_0 + \phi_{filt}$ is a constant phase independent of k and $\phi'_t = -\omega_{RF}r_k/c + \theta'_0$. The filtered signal in Eq. 13 is identical in form to that obtained by direct receipt of an RF pilot signal at frequency $\omega_{RF}$ as described by Eq. 2. It follows then that the processing of the signal Eq. 13 required to synthesize and transmit an amplified and conjugated signal at frequency $\omega_{RF}$ is identical to that of Eq. 2, as described above.

The beacons may radiate or transmit a single high-frequency carrier beam that encompasses all of the elements in the antenna array, or N-high-frequency carrier beams, where N is the number of elements comprising the RDA and each beam carries the same pilot signal to a single element of the RDA.

Those skilled in the art will appreciate that the carrier beam may occupy different portions of the frequency spectrum and modulation techniques other than those described here may be utilized.

Those skilled in the art will further appreciate that the component of the signal described in Eq. 11 at frequency $2\omega_{RF}$ may be utilized to transmit the pilot signal information if $2\omega_{RF} = \omega_{RF}'$, in which case only a high-pass filter is needed to extract the desired component of the detected signal. The filtered signal assumes the form $$v_{HP}^k(t) = C\cos\left[\omega_{RF}'\left(t - \frac{r_k}{c}\right) + 2\theta_0 + \phi_{HP}^k\right] \quad \text{(Eq. 14)}$$

where $\phi_{HP}^k$ is the phase imposed by the high-pass filter upon the signal detected by the $k^{th}$ receive element. By matching the high-pass filters associated with each element of the RDA, all values of $\phi_{HP}^k$ can be made to fall within a narrow range, in which case $\phi_{HP}^k$ can be treated as a constant independent of k;

$$v_{HP}^k(t) = C\cos\left[\omega_{RF}'\left(t - \frac{r_k}{c}\right) + 2\theta_0 + \phi_{HP}\right] \quad \text{(Eq. 15)}$$
$$= C\cos\left[\omega_{RF}'\left(t - \frac{r_k}{c}\right) + \theta_0''\right]$$
$$= C\cos(\omega_{RF}'t + \phi_t''),$$

where $\phi''_0 = 2\theta_0 + \phi_{HP}$ is a constant phase independent of k and $\phi'_t = -\omega'_{RF}r_k/c + \theta''_0$. The filtered signal in Eq. 15 is identical in form to that obtained by direct receipt of an RF pilot signal at frequency $\omega_{RF}$ as described by Eq. 2. It follows then that the processing of the signal Eq. 15 required to synthesize and transmit an amplified and conjugated signal at frequency $\omega'_{RF}$ is identical to that of Eq. 2, as described above.

A second means by which feedback may be prevented is to utilize a pilot signal of a first frequency and an amplified phase-conjugated signal 28 of a second frequency distinct from the first frequency. For example, if the first frequency of the pilot signal 18 is $\omega_1 = 2\pi f$ and the second frequency of the phase-conjugated signal is $\omega_2 = 2\omega_1 = 4\pi f$, then the phase conjugating circuitry may assume a form like that illustrated in FIG. 3, and, for example, as described in Rodenbeck, C. T.; Ming-yi Li; Kai Chang, "A phased-array architecture for retrodirective microwave power transmission from the space solar power satellite," *Microwave Symposium Digest*, 2004 *IEEE MTT-S International*, vol. 3, no., pp. 1679-1682 Vol. 3, 6-11 Jun. 2004, which is incorporated herein by reference in its entirety. In FIG. 3, the pilot signal 18 is received by the receive antenna 20, which transmits the received signal 18 to a first mixer 30. The first mixer 30 mixes the received signal 18 with a reference signal R whose frequency is $\omega_2 = 4\pi f$ and whose phase is $\phi_{REF}$ to generate an intermediate signal of the same form as that obtained by processing the signal from Eq. (3) with a low-pass filter. The intermediate signal is then applied to a second mixer 31 where it is mixed with itself to yield $$\cos(\omega t + \phi_{REF} - \phi_t) \times \cos(\omega t + \phi_{REF} - \phi_t) = \quad \text{(Eq. 16)}$$
$$\frac{1}{2}[1 + \cos(2\omega t + 2\phi_{REF} - 2\phi_t)]$$

where $\omega=2\pi f$, $\phi_t=-\omega r_k/c+\theta_0$, and $\phi_{REF}$ has the same value for all elements of the RDA. The phase conjugated signal at frequency $2\omega$ is extracted by processing this signal with a high-pass filter (not shown in FIG. 3) to eliminate the DC component. The phase conjugated signal is amplified with the amplifier 24 and transmitted by the transmitting antenna 26 of each element in the array. The phase-conjugated signal extracted from Eq. 16 and amplified and transmitted by the $k^{th}$ element of the RDA is of the form:

$$V_T^k(t)=C\cos(2\omega t+2\phi_{REF}-2\phi_t)=C\cos[2\omega(t+r_k/c)+2\phi_{REF}-2\theta_0] \quad \text{(Eq. 17)}$$

where C is the signal amplitude.

The amplified or high-power signal 28 incident on the WPR at time t from the $k^{th}$ element of the RDA is that transmitted at an earlier time $t-r_k/c$, so that $$V_{HP}^k(t) = D\cos[2\omega(t-r_k/c) + 2\phi_{REF} - 2\phi_t] \quad \text{(Eq. 18)}$$
$$= D\cos[2\omega(t-r_k/c) + 2\omega r_k/c + 2\phi_{REF} - 2\theta_0]$$
$$= D\cos[2\omega t + 2\phi_{REF} - 2\theta_0].$$

where D is the signal amplitude.

Because the phase of the incident signal $V_{HP}^k(t)$ is independent of the array index k, the signals from each array element arrive at the WPR with the same phase. If the polarization of the amplified signal transmitted by each transmitting antenna 26 is substantially the same, then the electromagnetic fields radiated by each array element, will add vectorially to yield a power density that exceeds that from a single element by about a factor of $N^2$, where N is the number of array elements;

$$V_{HP}^{total}(t) = \sum_{k=1}^{N} V_{HP}^k(t) = ND\cos(2\omega t + 2\phi_{REF} - 2\theta_0) \quad \text{(Eq. 19)}$$

$$\overline{P_{HP}^{total}} \propto \overline{[V_{HP}^{total}(t)]^2} = N^2 D^2 \overline{\cos^2(2\omega t + 2\phi_{REF} - 2\theta_0)} \quad \text{(Eq. 20)}$$
$$= \frac{1}{2} N^2 D^2$$

where $v_{HP}^{total}(t)$ in Eq. 19 is the amplitude of the total field incident on the WPR, and $\overline{P_{HP}^{total}}$ in Eq. 20 is the corresponding time-averaged power density.

As will be appreciated by those skilled in the art, different pilot-beam conjugated-signal frequency combinations may be utilized.

FIG. 4 shows an illustrative embodiment of a switched beam wireless power system in the context of a High-Altitude Long Endurance (HALE) microwave-powered aircraft 32. Such aircraft are of interest as long-endurance platforms for surveillance, remote sensing, and communications. Due to the limited amount of power available for propulsion, HALE aircraft, microwave-powered and otherwise, utilize ultralight construction and typically have long, high-aspect ratio wings for aerodynamic efficiency. The microwave-powered HALE aircraft 32 of the illustrative embodiment has a wingspan of 90 meters and a chord of 3.5 meters, flies at an altitude of 60,000 feet in a circle of radius 60,000 feet centered on an RDA 34 and requires delivery of 100 kW to the rectennas or WPRs to meet aircraft propulsion and payload power requirements. Although illustrated with respect to a HALE aircraft, the concepts described herein are applicable to wirelessly power any remote target, as will be appreciated by one of skill in the art.

The aircraft 32 is powered by microwave radiation 36 transmitted from an RDA 34 on the ground. The electromagnetic energy 36 is received by one or more WPRs on the aircraft 32, which receive the electromagnetic energy 36 and convert it to DC power, which may be used by power-conditioning electronics and other components on the aircraft 32. The DC power delivered to the power-conditioning electronics on board the aircraft 32 will be reduced by rectenna scan losses and other dissipative losses, as will be appreciated.

In one embodiment, the WPRs are located on the underside of a wing of the aircraft 32, which provides a relatively large surface on which multiple WPRs may be placed. It will be appreciated, however, that the WPRs may be located on other areas of the aircraft, as may be desired.

The RDA 34 illustrated in FIG. 4 has sixteen elements arranged in a 4×4 grid. The system operates at a frequency of 8 GHz, which assures a low-loss propagation path in all weather conditions. It will be appreciated, however, that a different frequency may be utilized as may be desirable. It also will be appreciated that the RDA 34 may include more or fewer elements and that the elements may be arranged in configurations other than a 4×4 grid, for example, the elements may be in any array of two or more elements. In some applications it may be advantageous to add an element of randomness to the arrangement of the elements of the RDA 34 (e.g., such that the elements are not arranged in a grid), to eliminate or to reduce grating lobes.

If the elements are mechanically steered, the spacing between elements in the RDA 34 must be sufficiently large to eliminate the possibility of blockage from adjacent elements, e.g., the elements must be spaced far enough apart from one another such that each element is able to maintain a line of sight with the aircraft 32 as it moves in the sky. If the element aperture diameter is D, the minimum spacing between elements is L, and the elevation angle is $\theta$, no blockage between adjacent elements occurs when the following condition is satisfied:

$$L \geq \frac{D}{\sin\theta} \quad \text{(Eq. 21)}$$

In the exemplary embodiment of FIG. 4, if D=8 meters and the elevation angle $\theta \geq 45°$, there will be no blockage if $L \geq 11.3$ meters. Thus, the spacing between the adjacent elements in the RDA 34 may be any length greater than 11.3 meters to avoid blockage. In one embodiment, the spacing between elements may be about 15 meters. As will be appreciated, Eq. 21 may be used to calculate the appropriate distance between different sized elements or apertures and/or for different elevations.

In one embodiment, each element in the RDA 34 is a high-gain 8-meter diameter parabolic reflecting antenna that is fed by a high-power microwave source such that the radiated power per element in the RDA 34 is 100 kW and the total radiated power from the 4×4 array is 1.6 MW.

Power can be delivered efficiently to the rectenna on the aircraft 32 by dividing the power needs of the aircraft 32 into two or more sections and equipping each section with a beacon, such as an RF beacon, that radiates a pilot signal to the RDA 34. The beacon causes the electromagnetic radiation transmitted from the RDA 34 to be electronically steered from one section of the wing to another. The different sections of the wing, therefore, can be illuminated by a narrow beam from the RDA 34, which may reduce the amount of electromagnetic energy that falls between the WPRs and improve the overall energy transfer efficiency of the system.

The underside of a wing 40 from the aircraft 32 is illustrated schematically in FIGS. 5A-5C. The wing 40 is divided into three sections 42, 44, 46 based upon the power needs of the aircraft 32. A first beacon 48 is located on the first section 42, a second beacon 50 is located on the second section 44 and a third beacon 52 is located on the third section 46. As will be appreciated, each beacon 48, 50, 52 is collocated with a respective WPR. It will be appreciated that the system may include more or fewer sections and beacons than those illustrated in FIGS. 5A-5C. Also illustrated in FIGS. 5A-5C are several individual elements 34a-d from the RDA 34. For simplicity of description, four elements 34a-d are shown, however, It will be appreciated that the RDA may include any number of elements, each operating in the same manner as those illustrated in FIGS. 5A-5C.

In FIG. 5A, microwave power is delivered to the first section 42 of the wing 40 by activating the first beacon 48 and deactivating the second beacon 50 and third beacon 52. The first beacon 48 radiates a pilot signal 54 that is received by each element 34a-d in the RDA 34. As described above with respect to FIG. 1, each element 34a-d conjugates the phase of the pilot signal 62. The phase conjugated signal is then amplified and radiated from each element 34a-d in the direction of the active beacon, which, in this example, is in the direction of the first beacon 48, e.g., along the general path of the pilot signal 54 received by each element 34a-d. The amplified signals 56 radiated from each element 34a-d in the RDA 34 converge around the first beacon 48 and the first section 42 of the wing 40. The electric-field vectors of the amplified signals 56 are in phase and of the same polarization and therefore add vectorially to power the WPR located at the first section 42 with a signal that is greater than the signal emitted from any one element in the array.

In FIG. 5B, the microwave power is delivered to the second section 44 of the wing 40 by activating the second beacon 50 and deactivating the first beacon 48 and the third beacon 52. When activated, the second beacon 50 radiates a pilot signal 58 that is received by each element 34a-d in the RDA 34. As described above with respect to FIG. 1, each element 34a-d conjugates the phase of the pilot signal 58. The phase conjugated signal is then amplified and radiated from each element 34a-d in the direction of the second beacon 50, e.g., along the general path of the pilot signal 58 received by each element 34a-d in the RDA 34. The amplified signals 60 radiated from each element 34a-d in the RDA 34 converge around the second beacon 50 and the second section 44 of the wing 40. The electric-field vectors of the amplified signals 60 are in phase and of the same polarization and therefore add vectorially to power the WPR located at the second section 44.

In FIG. 5C, the microwave power is delivered to the third section 46 of the wing 40 by activating the third beacon 52 and deactivating the first beacon 48 and the second beacon 50. When activated, the third beacon 52 radiates a pilot signal 62 that is received by each element 34a-d in the RDA 34, which conjugates and amplifies the pilot signal 62 and radiates the amplified signal 64 from each element 34a-d in the general direction of the third beacon 52, e.g., along the path of the pilot signal 62. The amplified signals 64 radiated from each element 34a-d in the RDA 34 converge around the third beacon 52 and the third section 46 of the wing 40. The electric-field vectors of the amplified signals 64 are in phase and of the same polarization and therefore add vectorially to power the WPR located at the third section 46.

In this manner, microwave power can be delivered to any number of rectenna sections on the underside of the wing 40. As will be appreciated, as long as the aircraft remains within the beam of the RDA, the process by which the position of the beam is switched from one section to another is entirely electronic and no mechanical beam steering is required. Furthermore, this same process may be used to electronically steer microwave power to any number of dispersed WPRs as long as all of the WPRs lie within the beam radiated by a single element of the RDA. As described in more detail below with respect to FIG. 12, if all of the WPRs do not lie within the beam radiated by a single element of the RDA, for example, if the WPRs are widely dispersed or if the WPRs are moving over a large field, then mechanical steering may be used to mechanically aim each element at the target object.

Figure 6:
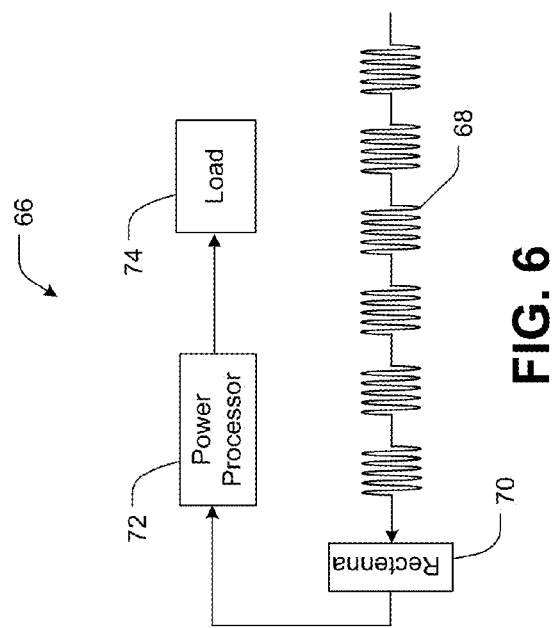
FIG. 6 is a schematic block diagram of a power processing module.

In general, the equipment to which each WPR delivers power requires constant average power at its input. In order to deliver a constant level of power to the input, each WPR in the switched-beam wireless power transmission system must implement power storage and processing functions, as shown schematically in the power processing module 66 of FIG. 6. The power processing module 66 receives pulses of power 68 from the RDA with a rectenna 70. The pulses of power 68 are accepted, stored and processed with a power processor 72. The power processor 72 outputs a constant DC power supply that can be used to drive an electrical load 74 which may consist of electronic equipment, electric motors, etc. Thus, the power processor 66 converts the pulses of power received from the RDA into a constant DC power supply.

Figure 7:
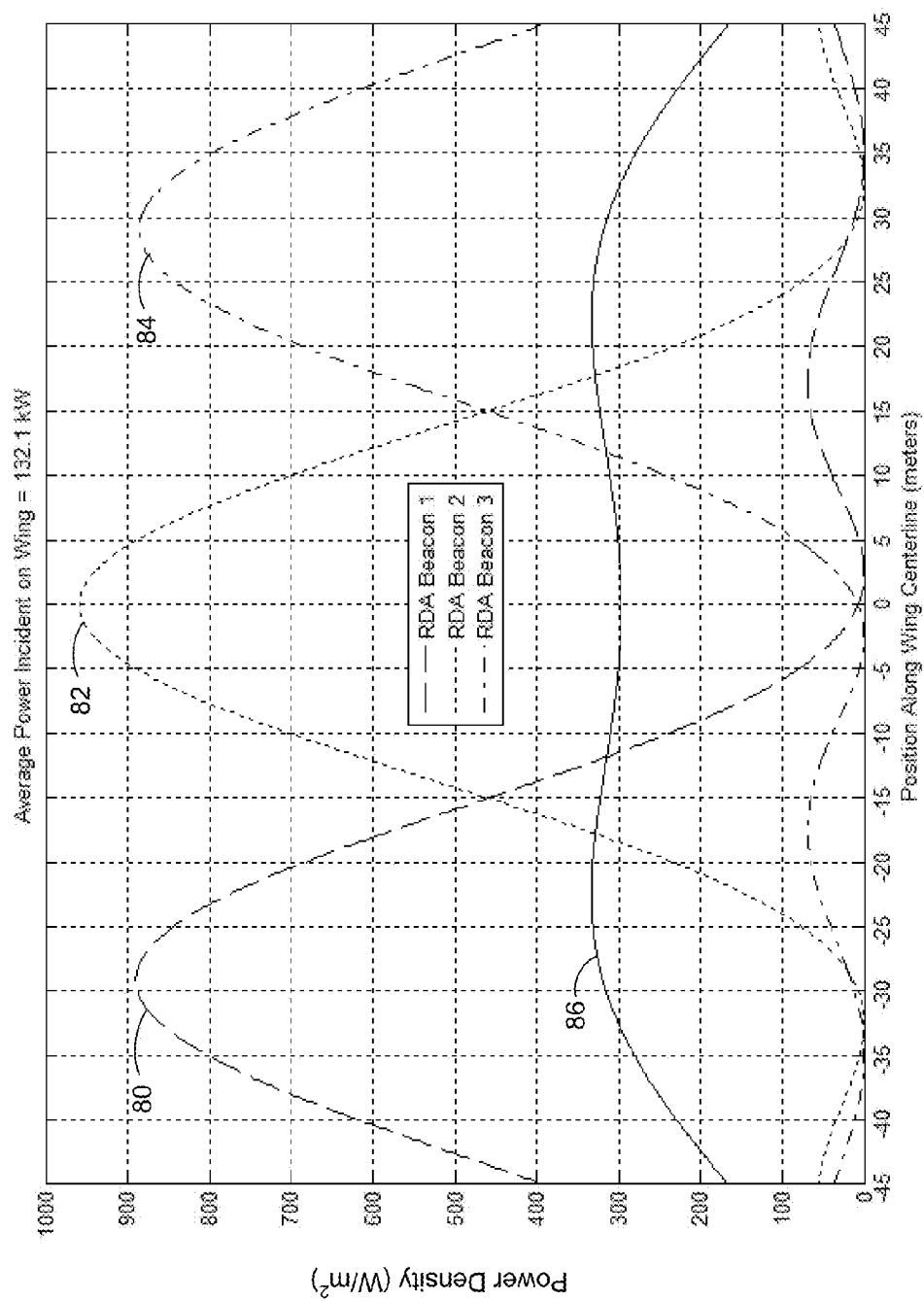
FIG. 7 is a graph of incident power density as a function of position along a centerline of the wing of the aircraft of FIGS. 5A-5C when all elements of the RDA function normally.

The results of applying the switched-beam technique to the microwave-powered aircraft 32 of the illustrative embodiment are shown in FIG. 7. The graph in FIG. 7 illustrates the calculated power density as a function of the position on the wing when the first beacon 48, second beacon 50 and third beacon 52 are located at y=−30 meters, y=0, and y=+30 meters along the wing centerline, respectively. The graph is a line plot of the power density along the wing centerline for each successive illumination of the beacons as described above with respect to FIGS. 5A-5C.

In FIG. 7, curve 80 corresponds to the power density profile of the wing 40 when the first beacon 48 is illuminated (or activated) and the second and third beacons 50, 52 are not activated, e.g., as described above with respect to FIG. 5A. Curve 82 corresponds to the power density profile of the wing 40 when the second beacon 50 is illuminated or activated and the first and third beacons 48, 52 are turned off, e.g., as described above with respect to FIG. 5B. Curve 84 corresponds to the power density profile when the third beacon 52 is activated or illuminated and the first and second beacons 48, 50 are not activated, e.g., as described above with respect to FIG. 5C.

FIG. 7 also illustrates a dwell time based weighted average of the power density profile along the centerline of the entire wing 40 at curve 86. The dwell time is the amount of time which a particular beacon is activated, e.g., the amount of time that the particular section of the wing is illuminated with electromagnetic radiation. The curve 86 represents the weighted average obtained by applying a set of weights to the three curves 80, 82, 84 based on the fraction of time for which each beacon is active. In the example illustrated in FIGS. 5A-5C, the weights are chosen to equalize the average power delivered to the three 30-meter sections 42, 44, 46 into which the aircraft wing 40 is divided in the example. As will be appreciated, the dwell times may be selected or controlled by an operator, or may be based on a schedule.

The instantaneous power levels delivered when first, second and third beacons 48, 50, 52 are active are denoted below by $P_1$, $P_2$, and $P_3$, respectively. Let α represent the dwell time fraction for the first section 42, i.e., the fraction of time that the first beacon 48 is active. Assuming the same dwell time for the third beacon 52, the time-average power level delivered to each section 42, 44, 46 is $$P_1^{avg} = \alpha P_1$$

$$P_2^{avg} = (1-2\alpha)P_2 \qquad \text{(Eq. 22)}$$

$$P_3^{avg} = \alpha P_3$$

and the total average power delivered to the aircraft is $$P_{tot}^{avg} = \alpha P_1 + (1-2\alpha)P_2 + \alpha P_3. \qquad \text{(Eq. 23)}$$

If the size and location of each WPR is symmetric with respect to the wing axis parallel to the direction of flight, it is reasonable to assume that $P_1 \approx P_3$, in which case the value of α is determined by setting $P_1^{avg} = P_2^{avg}$ and solving the resulting equation for α; one obtains $$\alpha = \frac{P_2}{P_1 + 2P_2} \qquad \text{(Eq. 24)}$$

Numerical experiments confirm that $P_1 \approx P_3$ and that nearly equal power is delivered to each section 42, 44, 46 when the beam dwells on the first section 42 and the third section 46 34.8% of the time (α=0.348) and on the second section 44 30.4% of the time. Under these conditions, 44.0 kW is delivered to the first, second and third sections 42, 44, 46. The total power delivered to the aircraft 32 is 132.1 kW, which is 8.26% of the 1.6 MW radiated by the RDA 34.

The transmission efficiency, e.g., the ratio of the total power delivered to the aircraft 32 to the total power radiated by the RDA 34 can be increased by increasing the diameter of each element in the RDA to narrow the width of the beam or by increasing the number of elements in the RDA.

Figure 8:
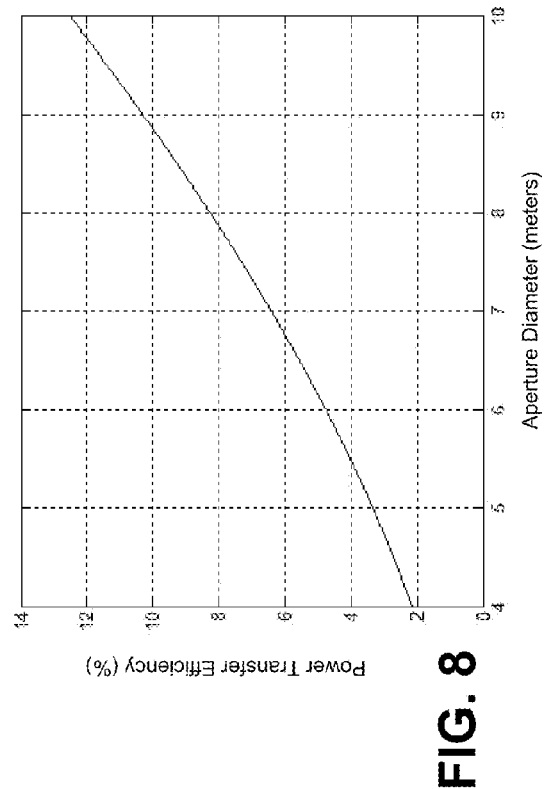
FIG. 8 is a graph of power transfer efficiency as a function of aperture size for the microwave-power aircraft of FIGS. 5A-5C.

FIG. 8 shows the effect of varying aperture size on the performance of the 4×4 RDA 34 of the illustrative embodiment. In FIG. 8, the power transfer efficiency is calculated as a function of aperture diameter for a 4×4 array of antennas, each separated by 15 meters in an X direction and by 15 meters in a Y direction. The dwell time weights for each data point are calculated using Eq. 24 to equalize power transfer to each of the three aircraft sections 42, 44, 46.

As illustrated by the graph in FIG. 8, the power transfer efficiency is increased by increasing the size of each aperture. As discussed earlier, there is a limit on the maximum aperture diameter imposed by geometry. The limits are quantified by Eq. 19. For a 15 meter separation, the maximum aperture diameter is 10.6 meters.

Figure 9:
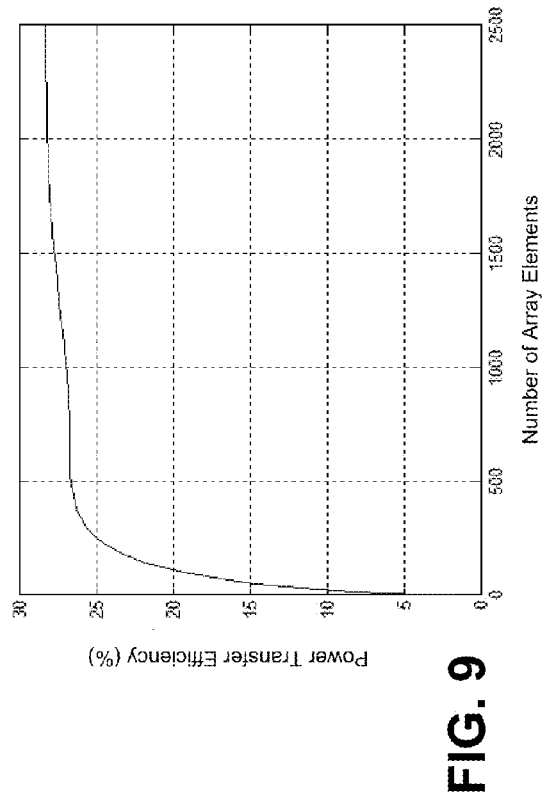
FIG. 9 is a graph of power transfer efficiency as a function of array size (total number of elements) for the microwave-power aircraft of FIGS. 5A-5C.

FIG. 9 shows the impact of increasing the number of elements in the RDA on the power transfer efficiency. As in the illustrative embodiment, the array consists of 8-meter apertures with an aperture-to-aperture separation of 15 meters in an N×N configuration. The results of varying the total number of array elements $N^2$ are plotted in FIG. 9. As shown in FIG. 9, the power transfer efficiency rises rapidly initially as elements are added to the array, however, the power transfer efficiency effectively plateaus once $N^2 > 500$.

In the illustrative embodiment of the HALE aircraft 32, substantially the same amount of power is constantly delivered to each of three WPRs. It will be appreciated, however, that delivery of different power levels to each of the three WPRs and different time-varying power levels, i.e., dynamic power allocation, is possible. Implementation of dynamic power allocation requires a feedback loop between the transmitter and each WPR, as will be appreciated.

For example, in the context of the illustrative embodiment, suppose that each of the three WPRs aboard the microwave-powered aircraft 32 have time-varying power requirements. Let the dwell time fractions for each be denoted by $\alpha_1$, $\alpha_2$, and $\alpha_3$. Power-sensing circuitry incorporated into the power-conditioning electronics fed by each WPR can monitor the instantaneous and time-averaged power outputs of the corresponding WPR. This information, along with the average power requirement, is transmitted to the RDA 34. The RDA 34 incorporates one or more receivers to receive the signals, and circuitry to calculate an error function based on the difference between the power output of each WPR and the power requirement of the corresponding power-conditioning electronics.

For example, let the error function for the $k^{th}$ WPR be $\delta_k = P_k^{require} - P_k^{out}$, where $P_k^{out}$ is the average output power of the $k^{th}$ WPR and $P_k^{require}$ is the required average power. If the received average power is more than required, $\delta_k < 0$, and the corresponding dwell time fraction $\alpha_k$ (where k=1, 2, or 3) is reduced until $|\delta_k| \leq \delta_{threshold}$, where $\delta_{threshold}$ is a positive constant denoting the maximum acceptable value of $|\delta_k|$. If the received power is less than required, $\delta_k > 0$, and the corresponding dwell time fraction $\alpha_k$ (where k=1, 2, or 3) is increased until $|\delta_k| \leq \delta_{threshold}$. Those skilled in the art will appreciate that other error functions may be used and other types of feedback loops implemented between each WPR and the RDA.

The long-endurance aspect of HALE aircraft requires a wireless power transmission system of very high reliability. The switched beam wireless power transmission system described herein satisfies this requirement by distributing the microwave power generating function among many separate power-generating elements in the RDA 34. Each element of the RDA 34 generates and radiates its own power. Thus, if the performance of one element degrades, if the element fails completely, or if the element is blocked or otherwise prevented from transmitting power to the WPR, the system performance slowly degrades.

As described above, FIG. 7 shows that 132.1 kW is delivered to the aircraft 32 when all array elements 34*a-d* function normally. Thus, the power delivered to the aircraft exceeds the power delivery requirement of 100 kW. The excess capacity of the system (approximately 32.1 kW) will be needed if one or more elements fail.

Figure 10:
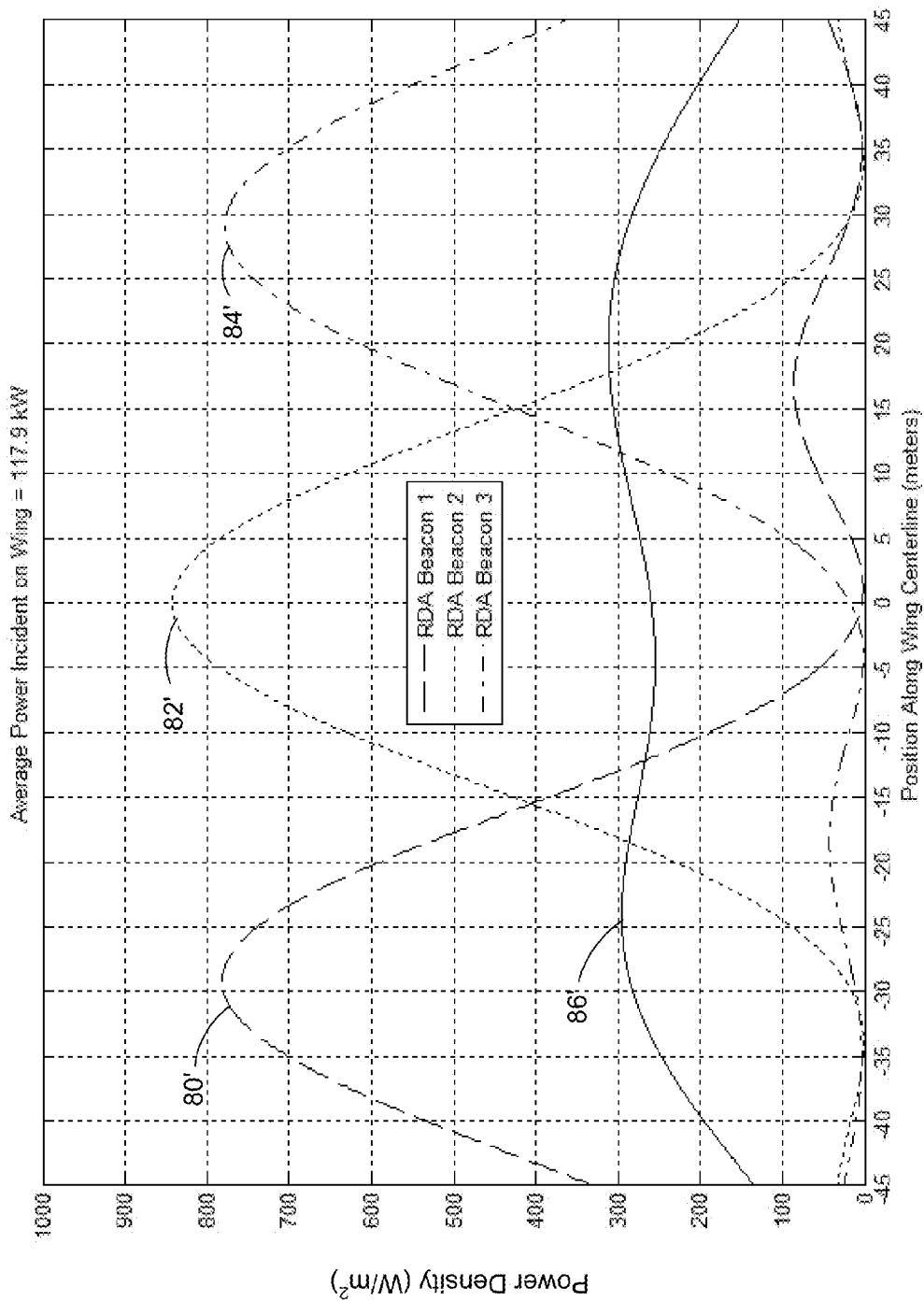
FIG. 10 is a graph of incident power density as a function of position along the centerline of the wing of the aircraft of FIGS. 5A-5C in the event of a single random element failure.

The power density in the event of a single random element failure is illustrated in FIG. 10. In this particular instance, the total power delivered in the event of a single element failure is 117.5 kW, as indicated by curve 86'. As indicated in FIG. 10 the total power 86' is divided such that 39.0 kW is delivered to the first section 42 (curve 80'), 39.7 kW is delivered to the second section 44 (curve 82'), and 39.1 kW is delivered to the third section 46 (curve 84') using the same dwell time schedule as used to generate FIG. 8.

Figure 11:
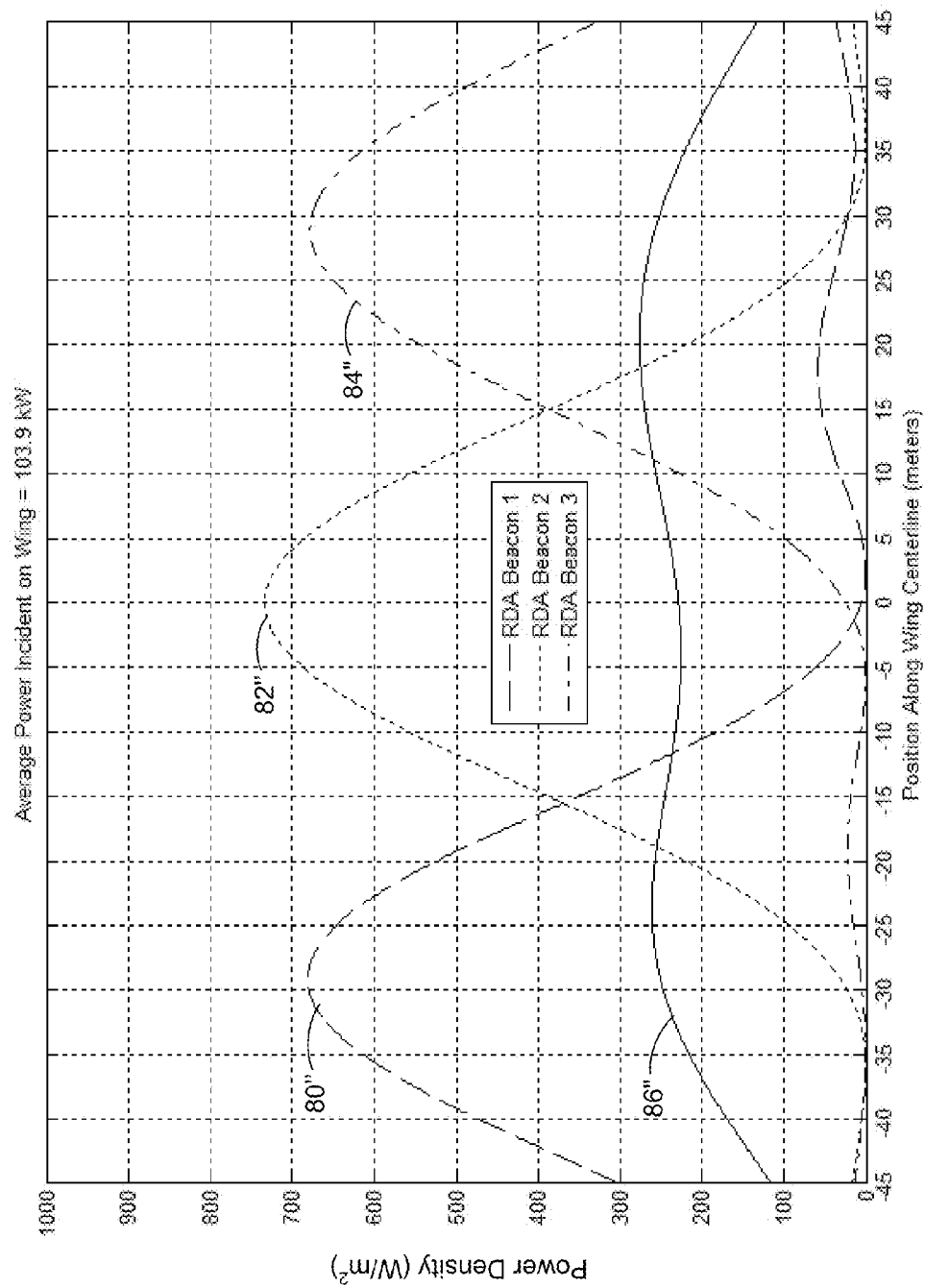
FIG. 11 is a graph of incident power density as a function of position along the centerline of the wing of the aircraft of FIGS. 5A-5C in the event of two simultaneous random element failures.

The power density in the event of two random element failures is illustrated in FIG. 11. For this particular instance of two random element failures, the total power delivered to the wing 40, as indicated by curve 86" is 103.9 kW. As indicated in FIG. 11, 34.2 kW is delivered to the first section 42 (curve 80"), 35.4 kW is delivered to the second section 44 (curve 82"), and 34.2 kW is delivered to the third section 46 (curve 88"). Thus, the exemplary system has sufficient built-in redundancy that it can continue to meet the delivered-power requirement if two random elements in the RDA 34 fail.

Figure 12:
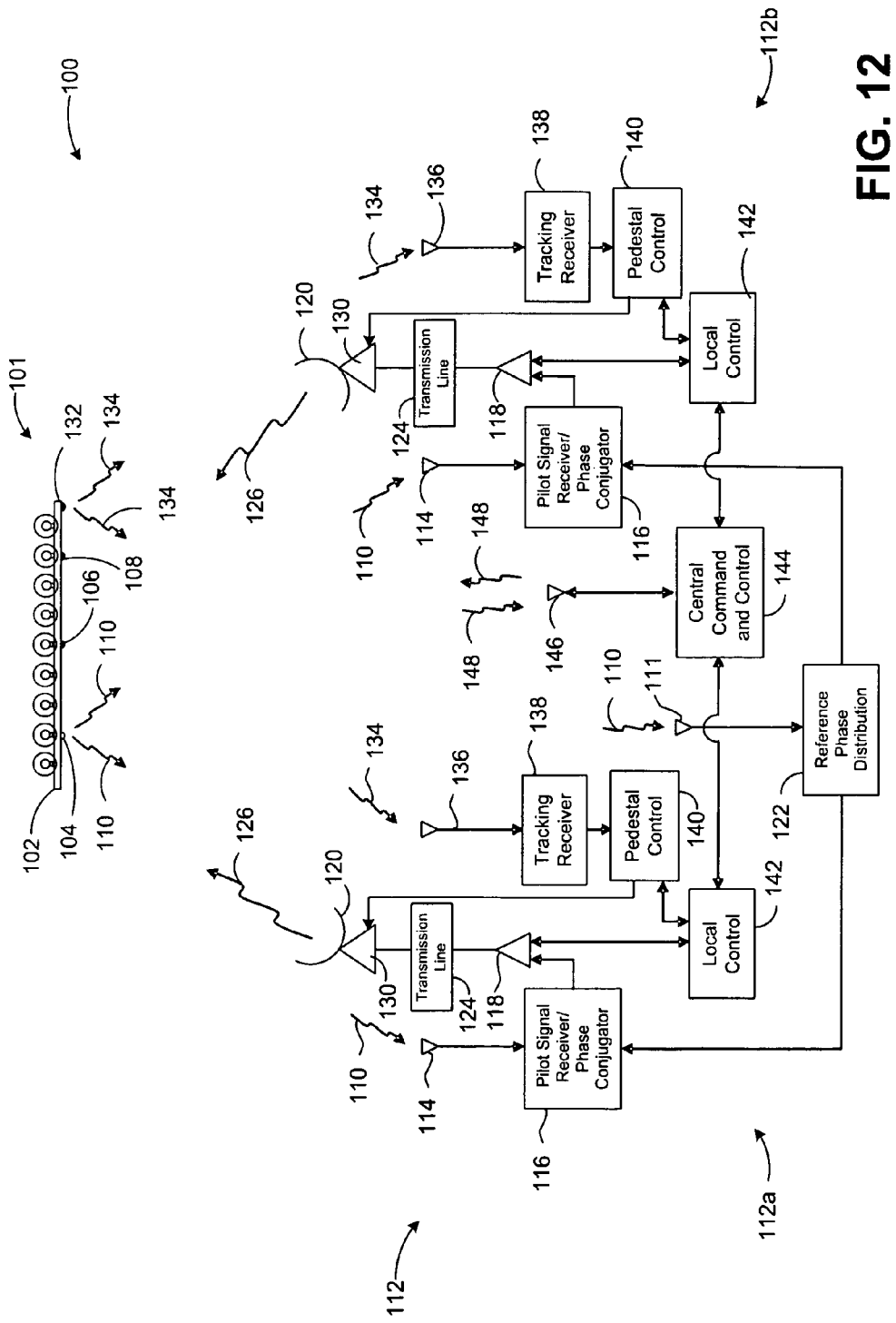
FIG. 12 is a schematic illustration of two elements in a switched-beam wireless power transmission system.

Referring now to FIG. 12, a schematic diagram of a complete switched-beam wireless power transmission system 100 in the context of a microwave-powered aircraft 101 is illustrated. The underside of a wing 102 on the aircraft 101 includes three beacons 104, 106, 108. Each beacon 104, 106, 108 is associated with a different WPR on the aircraft 101. In FIG. 12, the first beacon 104 is active and the second beacon 106 and third beacon 108 are inactive. The first beacon 104 radiates a pilot signal 110 that is received by all elements of the RDA 112.

Although only two exemplary elements 112a, 112b from the RDA are shown, it will be appreciated that the RDA may include any number of elements and, for example, may be a 4×4 array of elements. Each element 112a, 112b includes a low-gain receiving antenna 114 for receiving the pilot signal 110 and a pilot signal receiver and phase conjugator 116 (also referred to as a "receiving unit") having circuitry to receive and derive a phase-conjugated signal from the pilot signal 110, for example, as described above with respect to FIG. 2.

The pilot signal receiver/phase conjugator 116 includes a phase-conjugating circuit (also referred to as the "PCC"). The PCC requires a phase reference signal to conjugate the phase extracted from the pilot signal 110. The phase reference signal is supplied by a reference phase distribution circuit 122. The reference phase distribution circuit 122 receives the pilot signal 110 from the activated beacon 104 by way of a receiving antenna 111. The reference phase distribution circuit 122 amplifies and processes the pilot signal 110, and then divides and distributes the amplified and processed reference signal to each element 112a, 112b in the RDA 112. The processed reference signal may oscillate at twice the frequency as the pilot signal 110 as described above with respect to FIGS. 2 and 3, for example. Thus, for an array of N elements, the amplified pilot signal is divided into N different signals, each directed to a different element in the RDA. The reference signals are transmitted to a phase reference port of the pilot signal receiver/phase conjugator 116, such that the reference signal arrives at each respective PCC with the same phase. The reference signal therefore provides a baseline for the conjugation of the phase extracted from the pilot signal 110 received at each individual element in the RDA.

The PCC for each element 112a, 112b of the RDA is located at the pilot signal receiver and phase conjugator 116. The length of each transmission line with the phase reference signal from the distribution unit 122 to each pilot signal receiver and phase conjugator 116 must therefore be equal to one another or within a fraction of a wavelength to provide a consistent reference signal to each element in the RDA. This may prove difficult for a large array in which the elements are dispersed over a wide area.

As an alternative, the PCC for each element can be located near the reference phase distribution unit 122. This type of arrangement is known as "central phasing" as described in Chernoff, R. C., "Large Active Retrodirective Arrays for Space Applications," IEEE Trans. Antennas and Propagation, Vol. AP-27, No. 4, pp. 489-496, July, 1979, which is incorporated herein by reference in its entirety. When using a central phasing phase-distribution scheme, it is not necessary to equalize the lengths of the transmission lines carrying signals between the PCCs and the array elements. In addition, the line-length discrepancies between the reference phase distributor 122 and the PCCs are compensated for by the PCC in the same way as path-length differences between individual array elements and the active beacon; in essence, the length of the transmission line carrying the received pilot signal from the receiving antenna 114 to the pilot-signal receiver and phase conjugator 116 is added to the distance $r_k$ between the active beacon and the receiving antenna 114 for the $k^{th}$ element of the RDA.

The phase conjugated signal is transmitted to an amplifier 118. The amplifier 118 may be a klystron amplifier, a traveling-wave tube amplifier, a solid-state amplifier, a magnetron directional amplifier, a gyroklystron amplifier, or another amplifier, as will be appreciated by one of skill in the art.

The amplifier 118 amplifies the conjugated signal and transmits the amplified signal to a high-gain antenna 120 via a transmission line 124. The transmission line may be a waveguide or a coaxial transmission line, or another type of transmission line depending on the frequency and the power level of the amplified signal. In general, a conventional waveguide is used when large amounts of power are to be transmitted. A coaxial transmission line may be used if the power transmission requirement is not too high, up to a few kilowatts. At frequencies in W-band (e.g., 75-111 GHz) and beyond, a corrugated waveguide or beam waveguide may be appropriate, as will be appreciated by one of skill in the art.

The high-gain antenna 120 radiates the amplified phase-conjugated signal 126 back towards the section of the aircraft with the activated beacon, which in the example of FIG. 12 is beacon 104. Each high-gain antenna 120 radiates in the direction in which it is pointed in the case of a mechanically-steered antenna, or in the direction in which the beam is electronically steered in the case of a phased array antenna. In order to deliver a significant portion of the radiated power 126 to the aircraft, the antenna 120 may be a high-gain, narrow beam antenna. The amplified phase-conjugated signals 126 from the RDA converge at the active beacon 104 with the same phase and polarization and add vectorially, or collectively accumulate, at the beacon 104 to wirelessly power the WPR associated with that section of the wing 102.

In order for the aircraft 101 to receive power, the aircraft 101 should remain within the beam radiated by the RDA 112. For example, if the aircraft 101 moves out of the beam radiated from an element in the RDA 112, the power delivered to the aircraft 101 may be insufficient to maintain flight or to operate the systems on the aircraft 101. Each element in the array 112a, 112b, therefore, is supported by a movable pedestal 130, which is capable of moving the transmission antenna 120 according to tracking information received from the aircraft 101.

In one embodiment, each element of the RDA is a conventional phased array antenna (also referred to as an "electronically steered array"), which consists of a large number of small antenna elements whose vertical and horizontal dimensions are on the order of about half of a wavelength to a full wavelength. Due to the small size of the elements, each element radiates a wide beam. The beam radiated by the array can be steered anywhere within the beam of a single element. Therefore, if the target WPR is moving, and the WPR transmits its location to the RDA, each element of the RDA can compute the phases that must be applied to each element of the phased array to steer the beam in the desired direction. These phases, which are separate from and independent of the conjugated phases needed to implement an RDA, generally are different for each element of a given phased array antenna. The conjugated phases are applied to each element of the RDA. If the elements in the RDA are phased arrays, then the conjugated phase is an overall phase that will be the same for all elements of the given phased array.

The position of the aircraft 101 relative to each element 112a, 112b in the RDA can be tracked in many different ways. For example, the aircraft 101 may include on-board electronics that relay the position of the aircraft 101 to each element in the array. The onboard electronics, for example, may include a tracking beacon 132, such as an RF beacon, that emits a tracking signal 134, such as radar-echo emulating pulses, that can be tracked by a radar or a tracking receiver 138 collocated with each array element 112a, 112b. The onboard electronics also can take the form of a Global Positioning System (GPS) receiver and a data link, which relays accurate positional information to the tracking receiver 138, for example, through the tracking beacon 132. The onboard electronics may track the position of the aircraft 101 relative to the RDA by GPS. If the elements of the RDA utilize mechanical steering to point each antenna in the desired direction, the positional information received through the radar-echo emulating pulses 134 from the aircraft 101 can be used to derive pointing commands for each element, which are relayed to a pedestal control unit 140 to move the pedestal 130 to aim the transmitting antenna 120 at the aircraft 101.

Each element of the RDA is equipped with a local control unit 142 that is linked to the pedestal control unit 140, the high-power amplifier 118, and to a central command and control unit 144. Each local control unit 142 monitors the operation of key components of the associated array element 112a, 112b. In particular, the local control 142 monitors the pedestal 130 and pedestal control unit 140 to ensure proper operation and monitors the operation of the high-power amplifier 118. In the event of a failure, a notice is sent to the central command and control unit 144, which initiates proper action, such as a shutdown of the array element in question and activation of a redundant array element.

The central command and control unit 144 includes an antenna 146 for controlling and communicating with the aircraft 101 with transmissions 148. The central control unit 144 monitors the operation of each element in the RDA and controls the operation of the aircraft 101.

The illustrative embodiment utilizes separate transmit and receive antennas operating at the same frequency. Those skilled in the art will recognize that different frequencies can be used for the pilot signal 110 radiated by each active beacon and the power-bearing signal 126 radiated by the switched-beam wireless power transmission system described herein.

As described above with respect to FIG. 12, if each element of the RDA is a conventional phased array antenna, then each element may be equipped with a local control unit linked to a pedestal control unit, at least one high-power amplifier, and central command and control unit. In such an embodiment, mechanical steering is not required to point or aim the elements of the array at the desired target. The control unit may receive the location of the active beacon in three-dimensional space from the pilot signal and derive the appropriate phase for each individual element in the array so that the beam or the electromagnetic radiation from each element in the array converges and adds vectorially at the active beacon.

In one embodiment, the phased array is implemented as an active array, in which each antenna element is powered by a respective RF amplifier, which typically is a solid-state amplifier. In another embodiment, the phased array is constructed using a single RF source and a corporate feed network with phase shifters applying the required phase shifts at the input to each antenna element.

It also will be appreciated that although described primarily with respect to the powering of an aircraft, the switched-beam wireless transmission system may be utilized in any number of environments, for example to transmit power across a body of water to an island or a boat, or to transmit power across a valley or other region that may be difficult to traverse, or to transmit electromagnetic radiation from outer space to one or more ground-based wireless power receivers.

Figure 13:
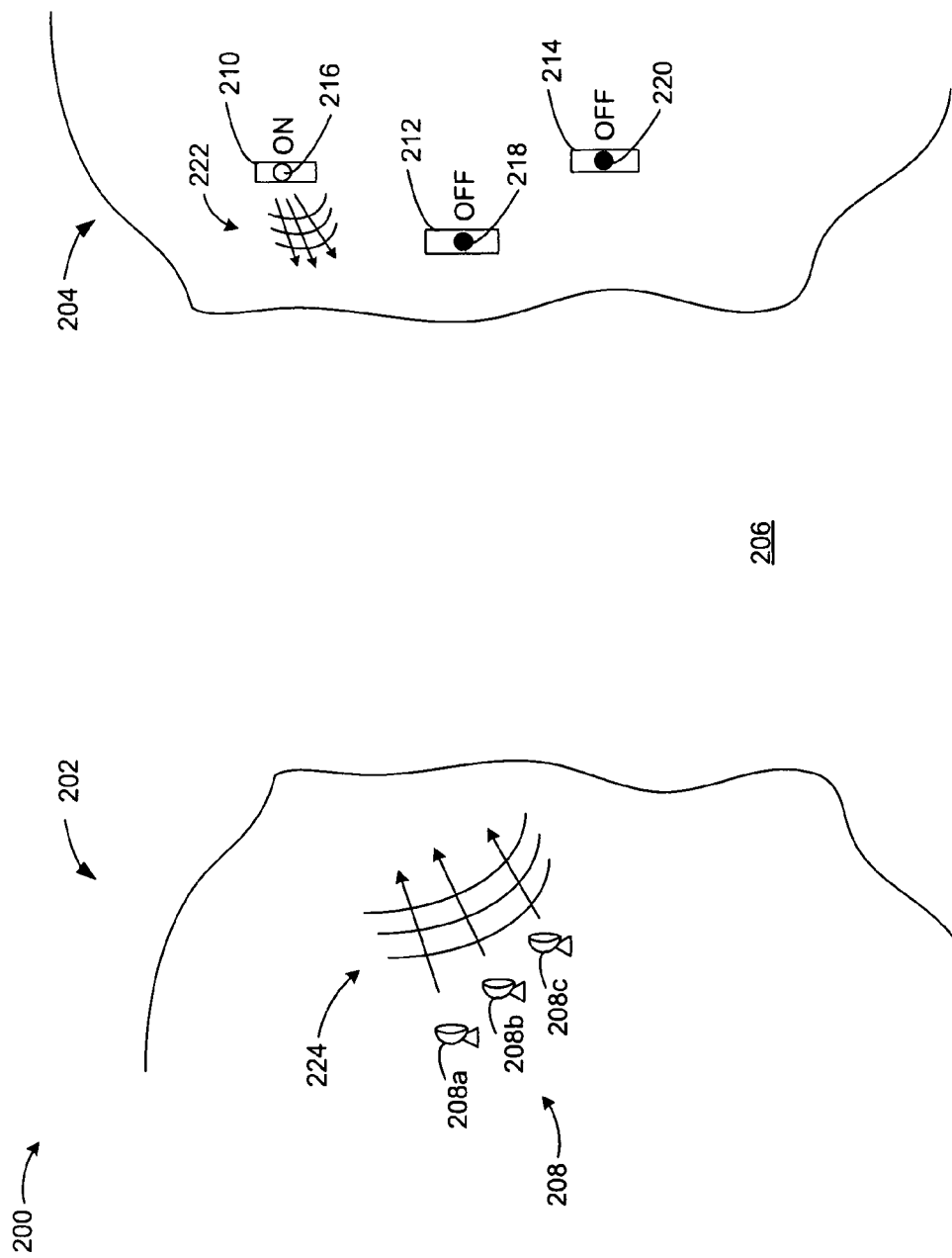
FIG. 13 is a schematic illustration of an embodiment of a switched-beam wireless power transmission system.

In the example of FIG. 13, the switched-beam wireless transmission system 200 is illustrated transmitting power from a first area 202 to a second area 204, for example, from one piece of land 202 across a body of water 206 to a second piece of land 204. In the illustrated example, the first area includes an RDA 208 that consists of three elements 208a-c and the second area 204 includes three dispersed WPRs 210, 212, 214, each collocated with a respective beacon 216, 218, 220.

As described above, the respective beacons are activated/deactivated to electronically steer the signal to the WPRs. In the illustrated example, beacon 216 is "on" or activated and radiates a pilot signal 222. The pilot signal 222 is radiated across the body of water 206 where it is received by the RDA 208. Each element 208a-c receives and extracts the phase from the pilot signal 222. Furthermore, each element conjugates the extracted pilot-signal phase and forms an amplified conjugated signal 224. The amplified conjugated signal 224 is radiated from each element 208a-c of the RDA 208 back along the path of the pilot signal 222 in the direction of the active beacon 216 such that the radiated signals 224 converge on the active beacon 216 and are received by the WPR 210. The other beacons 218, 220 on the other WPRs 212, 214 can similarly be activated and deactivated to electronically steer the signal to the WPRs 212, 214, for example, in a similar manner to that described above with respect to FIGS. 5A-5C.

In another embodiment, the wireless power transmission system may be used to transmit electromagnetic radiation from a remote source to at least one wireless power receiver, for example, to wirelessly power an object on the Earth or another planet, the moon, or another space-based object from outer space. As described above, each wireless power receiver may be collocated with a beacon that radiates a high-frequency carrier signal, such as a laser beam, with a pilot signal impressed or carried on the high-frequency carrier signal. The system also includes at least one transmitting antenna. The transmitting antenna includes a receiving unit that receives the high frequency carrier signal and circuitry to extract the pilot signal from the carrier signal, as described above. The transmitting antenna radiates electromagnetic radiation from the electromagnetic source in the direction of the beacon such that the signals transmitted from the transmitting antenna converge and add vectorially at the beacon to transmit power to the wireless power receiver.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A switched-beam wireless power transmission system, comprising:
   at least one electromagnetic radiation source;
   a plurality of wireless power receivers each collocated with a beacon that radiates a pilot signal when the beacon is in an active state; and
   an array of transmitting antennas that receives the pilot signal from the active beacon and radiates electromagnetic radiation from the at least one electromagnetic radiation source in the direction of the wireless power receiver collocated with the beacon in the active state,
   wherein the direction of the radiated electromagnetic radiation is switched among the wireless power receivers based upon which beacon is in an active state;
   wherein the wireless power receivers and the beacons are on a single object;
   wherein the beacons are successively activated to successively direct the electromagnetic radiation to different of the wireless power receivers on the single object; and
   wherein the transmitting antennas are retrodirective antennas that are steered at least in part electronically successively to the different of the wireless power receivers on the single object.

2. The wireless power system of claim 1, wherein each source of electromagnetic radiation is an amplifying source of electromagnetic radiation.

3. The switched-beam wireless power system of claim 1, further comprising:
   a receiving antenna collocated with each transmitting antenna that receives the pilot signal radiated from the beacon in the active state; and
   a receiving unit connected to each receiving antenna that receives and conjugates the pilot signal, and transmits the conjugated signal to the source of electromagnetic radiation.

4. The switched-beam wireless power system of claim 3, further comprising a power processing module that converts pulses of power received from the at least one source of electromagnetic radiation into a constant power supply.

5. The switched-beam wireless power system of claim 3, wherein pilot signal is transmitted via at least one high-frequency carrier and the first receiving unit includes circuitry to extract the pilot signal from the high-frequency carrier.

6. The switched-beam wireless power system of claim 5, wherein the high frequency carrier is a laser beam.

7. The switched-beam wireless power system of claim 1,
   wherein the pilot signal radiated from the beacon in the active state is at a first frequency; and
   wherein the array of transmitting antennas radiates electromagnetic energy at a second frequency.

8. The switched-beam wireless power transmission system of claim 1, wherein the array of transmitting antennas comprises at least two transmitting antennas whose radiated electromagnetic fields have the same polarization.

9. The switched-beam wireless power transmission system of claim 8, wherein the polarization is one of linear polarization or circular polarization.

10. The wireless power system of claim 1, further comprising a tracking beacon that radiates a tracking signal indicative of a location of the beacon.

11. The wireless power system of claim 10, further comprising
   a movable pedestal unit supporting each transmitting antenna;
   a pedestal control unit coupled to each movable pedestal unit; and
   a second receiving unit that receives the tracking signal radiated from the tracking beacon and provides tracking information to the pedestal control unit to point the transmitting antenna at the tracking beacon if the active beacon lies outside the field of view of the transmitting antenna.

12. The wireless power system of claim 10, wherein the tracking signal includes Global Positioning System (GPS) information, and the second receiving unit comprises a GPS receiver.

13. The wireless power system of claim 1, further comprising a transmission line connected to each amplifying source of electromagnetic radiation and each transmitting antenna, wherein the transmission line transports the electromagnetic radiation from the at least one source of electromagnetic radiation to each transmitting antenna.

14. The wireless power system of claim 13, wherein the transmission line is one of a rectangular waveguide assembly, a circular waveguide assembly, a coaxial transmission line assembly, or a beam waveguide.

15. The wireless power system of claim 1, wherein the array of transmitting antennas comprises a retrodirective array of antenna elements.

16. The wireless power system of claim 1, wherein the object is an aircraft.

17. The wireless power system of claim 16, wherein the wireless power receivers and the beacons are on an underside of a wing of the aircraft.

18. A method of wirelessly transmitting power from a retrodirective array to an array of wireless power receivers on a single movable object, the method comprising:
   (i) activating a beacon on a wireless power receiver on the object by radiating a pilot signal with the beacon;
   (ii) receiving the pilot signal, extracting the phase from the pilot signal, and forming a conjugated signal with a receiving unit on each element in the retrodirective array;
   (iii) amplifying each conjugated signal with an amplifier;
   (iv) radiating each amplified signal in the direction of the activated beacon with a transmitting antenna on each element in the retrodirective array;
   (v) receiving the amplified signal with the wireless power receiver that is collocated with the activated beacon; and
   (vi) deactivating the activated beacon by extinguishing the pilot signal and repeating steps (i)-(v) for a beacon on a different wireless power receiver on the object;
   wherein the radiating of each amplified signal further comprises radiating the amplified signal such that the signals radiated from each transmitting antenna add in phase successively at the different activated beacons, thereby steering the amplified signal electronically between the wireless power receivers.

19. The method of claim 18,
   wherein the radiating of each amplified signal comprises radiating an amplified signal that has linear polarization, wherein each radiated signal has the same linear polarization, and
   wherein the receiving of the amplified signal includes receiving the amplified signal with a dual-linearly polarized rectenna.

20. The method of claim 18,
   wherein the radiating of each amplified signal comprises radiating an amplified signal that has circular polarization wherein each radiated signal has the same circular polarization, and wherein the receiving of the amplified signal includes receiving the amplified signal with a circularly-polarized rectenna having the same polarization as the amplified signal.

21. The method of claim 18,
wherein activating a beacon comprises radiating a pilot signal from the beacon at a first frequency; and
wherein receiving the pilot signal and extracting the phase from the pilot signal comprises forming a conjugated signal at a second frequency with each receiving unit.

22. The method of claim 18, wherein each wireless power receiver has an average power requirement, the method further comprising activating the beacon associated with each wireless power receiver for a period of time to meet the average power requirement.

23. The method of claim 22, wherein the beacons are sequentially activated and deactivated to meet the average power requirements of each wireless power receiver in the array of wireless power receivers.

24. The method of claim 22, wherein an actual amount of power is received by each wireless power receiver, the method further comprising:
comparing the average power requirement for each wireless power receiver to the actual power received by each wireless power receiver; and
adjusting the period of time that each beacon is activated to meet the average power requirements of each wireless power receiver.

25. The method of claim 18, wherein each element in the array is associated with a tracking unit, the method further comprising the steps of:
radiating a tracking signal from a tracking beacon collocated with at least one wireless power receiver;
receiving the tracking signal with each tracking unit; and
moving the transmitting antennas in response to the tracking signal to aim the antennas in the direction of the tracking beacon.

26. The method of claim 18, wherein the object is an aircraft.

27. The method of claim 26, wherein the wireless power receivers and the beacons are on an underside of a wing of the aircraft.

28. The method of claim 18, further comprising choosing dwell times that the beacons on the different power receivers are active.

29. The method of claim 28, wherein the choosing the dwell times includes choosing the dwell times to equalize average power delivered to the different power receivers.

30. The method of claim 28, wherein the choosing the dwell times includes an operator controlling the dwell times.

31. The method of claim 18, further comprising also mechanically steering one or more elements of the retrodirective array.

* * * * *